Jan. 21, 1969     J. B. WATTS     3,422,835

VALVE FOR CHARGING SEWER LINE WATER TRAPS

Filed Dec. 20, 1965

James B. Watts
INVENTOR

BY Eugene D. Farley

Atty.

United States Patent Office 3,422,835
Patented Jan. 21, 1969

3,422,835
VALVE FOR CHARGING SEWER LINE
WATER TRAPS
James B. Watts, Portland, Oreg., assignor, by mesne
assignments, to McElligott Enterprises, Anchorage,
Alaska
Filed Dec. 20, 1965, Ser. No. 514,787
U.S. Cl. 137—115                          6 Claims
Int. Cl. E03f 7/00; E03d 5/00

ABSTRACT OF THE DISCLOSURE

A device for charging sewer line traps automatically upon decrease in main line water pressure comprising a branch line having a piston valve member telescopically received over the end of an adjustable tubular member, the piston having a first seat for sealing engagement with the end of the tubular member under normal pressure conditions in the main line and a second seat for sealing engagement with the inlet end of the chamber in which the piston and tubular member are mounted when the pressure in the main line is shut off. The piston being unseated from both the end of the tubular member and the end of the chamber, thus permitting flow to the trap, when the main line water pressure is decreased. The piston includes a metering pin for metering the flow of water through the tubular member.

---

This invention relates to valves for use in charging water into sewer line water traps to prevent the escape of sewer gas, i.e. to sewer trap priming valves.

Most municipal plumbing and sanitary codes require that automatic means be provided for supplying water to a sewer line water trap automatically or periodically to insure that the trap will be operative at all times in carrying out its function of preventing the escape of sewer gas. To satisfy this requirement, it is usual to interconnect the pressured house water line and the sewer trap with a spur water line, and to include in the spur line a valve designed to admit water to the trap as required to keep it full and operative.

The sewer trap priming valves of known type are subject to failure for various reasons. Since they are required to operate unattended over a long period of time, their moving parts are subject to corrosion. In many, which are of the type actuated by springs, the springs rust and break with resultant failure of the valve. Others are not subject to adjustment, either initially or during their service life as required by wear, or by variations in water line pressure.

It accordingly is the general purpose of the present invention to provide a priming valve for sewer line traps which is easily installed in diverse plumbing situations, which is adjustable easily and accurately to suit the job water line pressure, which does not rely for its operation on springs, bellows, or other components subject to wear and corrosion, which operates economically without wasting water, which will seal off the sewer line in the event the house line is drained, and which will keep the water trap primed reliably and automatically over long periods of time.

The manner in which the foregoing and other objects of this invention are accomplished will be apparent from the accompanying specification and claims considered together with the drawings, wherein:

In essence, the presently described priming valve for sewer line water traps comprises a case having a bore longitudinally therethrough and provided with connecting means for connecting it in series flow in a pressured water line interconnecting the house line and the trap. The case bore is formed with an upstream valve chamber of enlarged cross section. A tube having a longitudinal passageway of predetermined restricted diameter slidably is mounted in the bore of the case, with its upstream end projecting into the chamber. The tube is retained in place and adjusted by means of suitable detent means.

A cup-shaped piston having a passageway through its upstream end is telescoped over the upstream end of the tube in valve-seat-forming relation. The piston is arranged in such a manner that its upstream end is subject to the water pressure of the spur line while its downstream end forms a resilient air cushion within the chamber, acting to adjust the position of the piston in proportion to the water pressure exerted upon it.

A constant level of pressure normally is present in the house line. This is reduced, of course, each time one of the water outlets is opened. The valve of my invention takes advantage of such reduction in pressure to open and inject a quantity of priming water into the trap each time the pressure in the house line is reduced.

In the event of such a pressure reduction, the water pressure on the piston head is reduced with the result that the air cushion behind the piston pushes the latter upwardly, opening the passageway through the piston head and permitting the flow of water through the tube and into the trap. However, when the outlet in the house line is closed and the pressure resumes its normal high value, the water pressure on the piston head retracts the piston against the resilient force of the air cushion, seating the valve and shutting off the priming flow. The action thus is fully automatic and reliable over a long service life since it does not depend upon the action of springs or other corrodable driving elements which are subject to failure.

Figure 1:
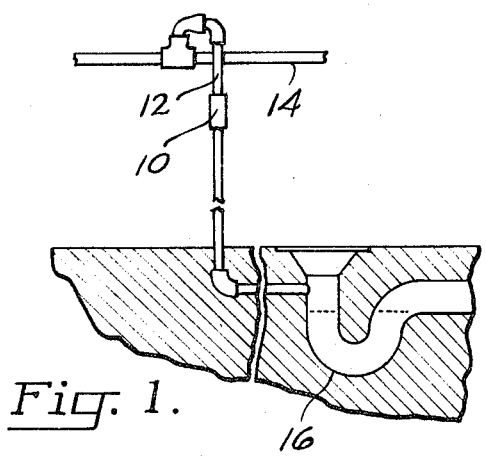
FIG. 1 is a schematic diagram illustrating the manner of installation of the herein described sewer line water trap priming valve.

Considering the foregoing in greater detail and with particular reference to the drawings:

As shown in FIG. 1, the water trap priming valve 10 of my invention is adapted for insertion in a pressured spur water line 12 which interconnects the house water line 14 and the sewer trap 16. Its function is to keep the trap charged with water at all times so that there is no possibility of escape of sewer gas.

The valve is contained in a case 18 having a doubly stepped bore therethrough. The steps of the bore determine an upstream valve chamber 20, a downstream priming water discharge chamber 22 and an intermediate guideway 24.

The upstream end of case 18 is internally threaded to receive a coupling element 26 by means of which the case is connected in spur water line 12. The coupling element has a longitudinal bore 28 which communicates with chamber 20. At its downstream end bore 28 is enlarged to provide an annular seat for a sealing ring 30 which cooperates with the moving components of the valve to seal off the valve in the event of failure of water pressure in the house line, as when the house line is drained, thereby insuring doubly against the transmission of sewer gas through the valve and into the building.

Slidably seated within guideway 24 is a tube 32 having therethrough a longitudinal passageway 34 of predetermined restricted diameter. The upper end of the tube is provided with an annular groove 36 in which is seated O-ring 38; its intermediate portion with an annular flange 40 designed to bear against the upper step of the case bore; and its lower portion with a first annular groove 42 designed to seat O-ring 44, and with a second annular groove 46.

The latter groove cooperates with detent means for retaining tube 32 slidably and adjustably in guideway 24 of the case.

In the illustrated form of the invention the detent means comprises a screw-operated eccentric 50, one end of which works in groove 46 and the other end of which is fixed to a screw 52 threaded into the side wall of case 18 and provided with a terminal slot 54 dimensioned for receiving a screwdriver by means of which the eccentric is adjusted.

Screw 52 extends beyond the plane of the outside surface of case 18 and receives a lock nut 56 by means of which eccentric 50 may be secured in any desired position of adjustment.

Tube 32 projects into chamber 20 a substantial distance. A cup-shaped piston 60 having an internal longitudinal recess 62 is telescoped over the projecting end of the tube, with its outer sidewall in sliding engagement with the inner side wall of chamber 20 and its inner side wall in sliding engagement with the outer side wall of tube 32.

The exterior surface of piston 60 is formed with an annular groove 64 in which is seated sealing ring 66. The piston thus is doubly sealed, internally and externally, by sealing rings 38, 66 respectively, and creates a resilient air cushion 20a.

Piston 60 is contoured and arranged so that when the valve is open a flow of water can pass from the upstream end of chamber 20, through the side wall of the piston into recess 62 therein, and thence through the bore 34 of tube 32 for discharge into sewer line trap 16.

To this end piston 60 is formed with a piston head 68 of reduced diameter having through its side walls ports 70 communicating with chamber 20 and recess 62. A flat sealing washer 72 is seated inside the piston head. It, together with the upstream end of tube 32 which seats against it, comprises the primary valve seat by means of which the valve is operated.

Since the diameter of passageway 34 through tube 32 is critical in determining the amount of water which is passed by the valve in its operation, means are provided for determining exactly the effective diameter of the passageway.

Figure 2:
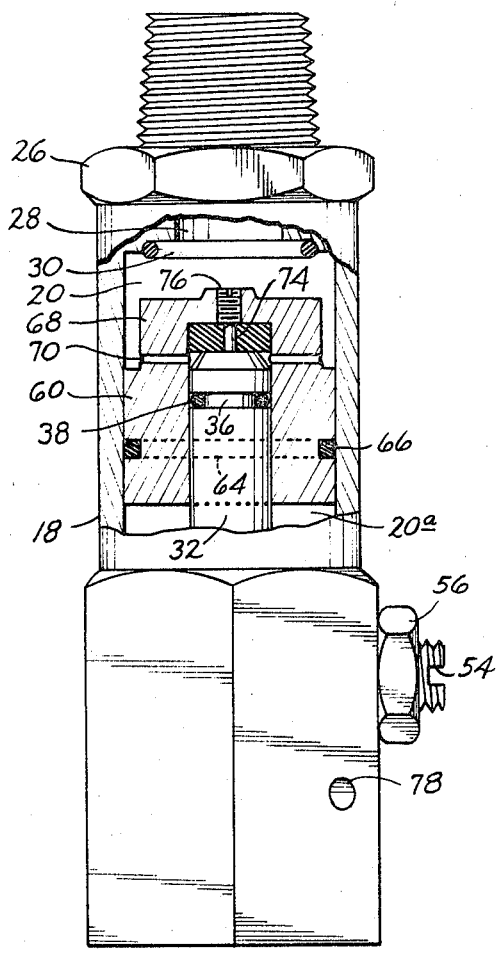
FIG. 2 is a view in side elevation, partly in section, of the valve in its closed position.

As seen in FIG. 2, the means provided for this purpose comprise a rod 74 having a thickened, threaded base 76. Base 76 is threaded into a threaded axial opening through piston head 68. Rod 74 then extends a substantial distance into passageway 34 of tube 32, coaxially therewith. The diameter of the rod determines the amount of water which will be transmitted by the passageway. If desired, rods of varying diameter may be provided as accessories to vary the capacity of the valve as desirable or necessary in various installations.

To insure against disturbance of the level of water in trap 16 by the development of a vacuum in the line downstream of valve 10, ports 78 are provided in the side walls of the lower portion of case 18, below the downstream discharge end of tube 32.

Operation

In its normal operation, valve 10 is inserted as shown in FIG. 1 in pressured water line 12 interconnecting house line 14 and trap 16. Eccentric 50 is adjusted by means of screw 52 as required to position tube 32 at an elevation with respect to piston 60 such that the piston is placed in an equilibrium position by the opposing forces of water pressure bearing down on piston head 68 from the water system and air pressure bearing upwardly against it from resilient air cushion 20a below the piston. In this equilibrium position, illustrated in FIG. 2, the upstream end of tube 32 seats against flat washer 72, closing the valve.

Figure 3:
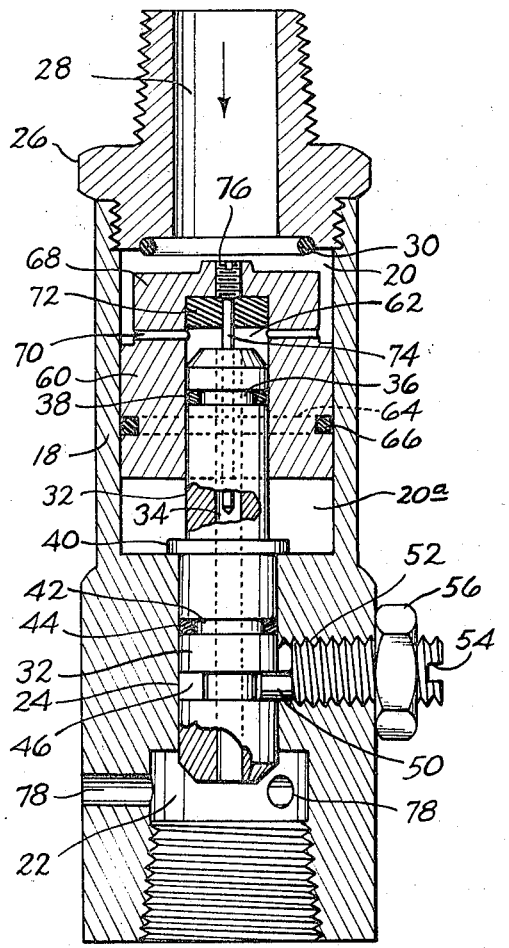
FIG. 3 is a view in longitudinal section illustrating the valve in its open position.

Whenever a faucet or other outlet is opened in house line 14 the pressure in the house line is reduced temporarily. This reduction in pressure is transmitted to spur line 12 with the result that the air pressure of the air cushion in chamber 20a pushes the piston upwardly to its FIG. 3 position. Water then passes from the house line into the upper portion of chamber 20 through ports 70 through passageway 34 in tube 32, into chamber 22 at the downstream end of case 18, and thence into trap 16. As soon as the faucet or other water outlet in house line 14 is closed, the pressure in house line 14 and also in spur line 12 increases again to its normal value. This retracts piston 60 to the closed position of FIG. 2.

In the event of a major reduction of water pressure in the house line, as when the house line is drained for some purpose, the air pressure of the air cushion in chamber 20a behind the piston pushes the piston upwardly until the upstream face of piston head 68 seats securely against sealing ring 30. This renders it impossible for sewer gas to escape into the house line, even though the latter remains drained over a long period of time and even though the water in trap 16 disappears entirely. Then when house line 14 is filled again, the valve instantly becomes operative without any further adjustment.

In the event that during the service life of the valve a running adjustment is required to compensate for changes in house line pressure, such adjustment may be made simply and accurately by eccentric 50 and screw 52.

It accordingly will be seen that there is provided an apparatus in which the several objects of this invention are achieved and which is well adapted for the conditions of practical use.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A valve for charging water into a sewer line trap from a spur water line connecting the trap and a primary water line transporting water under variable pressure, the valve comprising:
   (a) a case having a bore longitudinally therethrough,
   (b) connecting means for connecting the case in series flow in the spur water line,
   (c) the bore having an enlarged chamber at its upstream end,
   (d) a tube having a longitudinal passageway of predetermined restricted diameter mounted in the bore of the case with its upstream end projecting into the chamber,
   (e) cup-shaped piston means reciprocative in the chamber and dividing the latter into an upstream water chamber portion and a downstream air chamber portion, said portions being sealed from each other,
   (f) the piston means being telescoped over the upstream end of the tube and including valve seat means for releasably closing the upstream end of the tube passageway,
   (g) the piston means having a passageway communicating the upstream chamber portion with the upstream end of the tube passageway when the latter is open,
   (h) the upstream end of the piston means being subjected to the water pressure of the primary and spur lines to move the piston means against the opposing resilient air cushion in the air chamber portion to move the valve seat means to close the tube passageway under normal water pressure condition in the spur line,
   (i) the resilient air cushion in the air chamber portion operating under reduced water pressure condition in the primary and spur lines to move the piston means and valve seat means to open the tube passageway and allow water from the spur line to enter the sewer line trap.

2. The valve of claim 1 including a rod of predetermined diameter with reference to the diameter of the longitudinal passageway through the tube, and means for mounting one end of the rod in the piston means with the rod projecting into the tube passageway substantially coaxially therewith.

3. The valve of claim 1 including seal means interposed between the piston means and upstream end of the chamber for sealing off the valve upon turning off the pressure of water in the water line.

4. The valve of claim 1 wherein the tube is mounted in the bore of the case for longitudinal adjustment of its upstream end relative to the valve seat means, and securing means on the case engages the tube for retaining the latter in its position of adjustment.

5. The valve of claim 4 wherein the tube is provided with an annular exterior groove adjacent its downstream end and wherein the securing means comprises an eccentric received in the groove and mounted on a screw adjustably threaded through the case transversely thereof.

6. A valve for charging water into a sewer line trap from a spur water line connecting the trap and a primary water line transporting water under variable pressure, the valve comprising:
(a) a case having a bore longitudinally therethrough,
(b) connecting means for connecting the case in series flow in the spur water line,
(c) the bore having an enlarged chamber at its upstream end,
(d) a tube having a longitudinal passageway of predetermined restricted diameter mounted in the bore of the case with its upstream end projecting into the chamber and having also an annular exterior groove at its downstream end,
(e) detent means for retaining the tube in a predetermined position of longitudinal adjustment within the bore, the detent means comprising an eccentric received in the groove and mounted on a screw adjustably threaded through the case transversely thereof, and
(f) cup-shaped piston means having a passageway communicating with the tube passageway through its upstream end telescoped over the upstream end of the tube in valve-seat-forming relation,
(g) the upstream end of the piston means being subjected to the water pressure of the spur line and the downstream end thereof forming a resilient air cushion within the chamber acting to adjust the position of the piston means in proportion to the water pressure exerted upon it thereby alternately seating the piston.

References Cited

UNITED STATES PATENTS

| | | | |
|---|---|---|---|
| 2,295,871 | 9/1942 | Sloan et al. | 251—122 X |
| 2,403,751 | 7/1946 | Palmer | 251—122 X |
| 2,404,924 | 7/1946 | Sacchini | 137—517 X |
| 2,642,083 | 6/1953 | Strong | 251—263 X |
| 2,821,209 | 1/1958 | Waterman | 137—498 |
| 2,903,233 | 9/1959 | Magor | 251—251 X |
| 3,333,597 | 8/1967 | Sullivan | 137—247.25 X |

WILLIAM F. O'DEA, *Primary Examiner.*

DENNIS H. LAMBERT, *Assistant Examiner.*

U.S. Cl. X.R.

137—505.13, 519, 530, 543.15; 251—122